United States Patent [19]

Byfield, Jr.

[11] Patent Number: 4,673,240

[45] Date of Patent: Jun. 16, 1987

[54] SIDE MOUNT UNIVERSAL BATTERY TERMINAL

[76] Inventor: Dwight Byfield, Jr., 1436 N. Blackstone Ave., Fresno, Calif. 93703-3610

[21] Appl. No.: 345,619

[22] Filed: Feb. 4, 1982

[51] Int. Cl.$^4$ .............................................. H01R 4/30
[52] U.S. Cl. .................................. 439/755; 429/179; 411/378; 411/388; 411/389; 411/424
[58] Field of Search ............... 411/389, 388, 412, 378, 411/411, 424, 310, 311; 403/43, 44, 47, 118; 429/179; 339/263 B, 232, 224

[56] References Cited

U.S. PATENT DOCUMENTS

| 1,926,925 | 9/1933 | Wescott | 411/389 X |
| 2,425,935 | 8/1947 | Hayman | 411/389 X |
| 2,544,522 | 3/1951 | Bertelseh | 74/531 |
| 2,820,241 | 1/1958 | Schlage | 403/118 X |
| 3,096,678 | 7/1963 | Devine et al. | 411/64 |
| 3,605,065 | 9/1971 | Shannon | 429/179 X |
| 3,841,768 | 10/1974 | Adams | 403/118 X |
| 3,897,112 | 7/1975 | Walther et al. | 411/389 |
| 4,015,504 | 5/1977 | Rosan, Sr. et al. | 411/389 |
| 4,088,355 | 5/1978 | Dey | 411/389 X |
| 4,150,702 | 4/1979 | Holmes | 411/310 |
| 4,157,674 | 6/1979 | Carlson | 411/389 |
| 4,337,301 | 6/1982 | Rorer | 429/179 |

FOREIGN PATENT DOCUMENTS

| 821883 | 10/1951 | Fed. Rep. of Germany | 411/389 |
| 566552 | 1/1945 | United Kingdom | 411/424 |
| 634025 | 3/1950 | United Kingdom | 429/179 |

Primary Examiner—Gary L. Smith
Assistant Examiner—Rodney M. Lindsey

[57] ABSTRACT

An apparatus is provided for directly and conveniently connecting auxiliary electric devices to a conventional side-mounted terminal automobile battery.

2 Claims, 3 Drawing Figures

U.S. Patent
Jun. 16, 1987
4,673,240
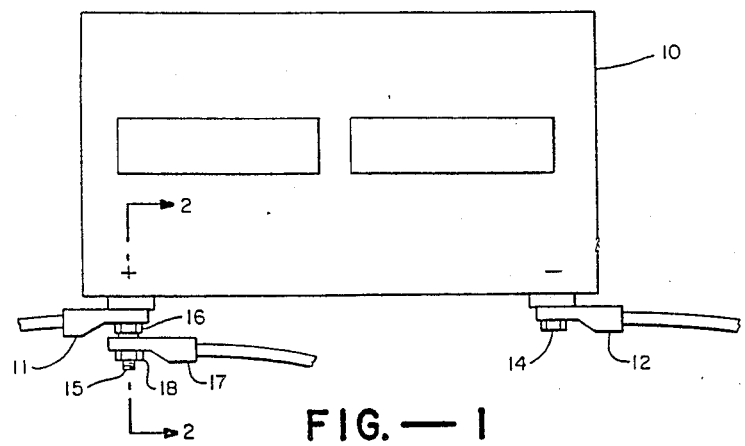
FIG.—1
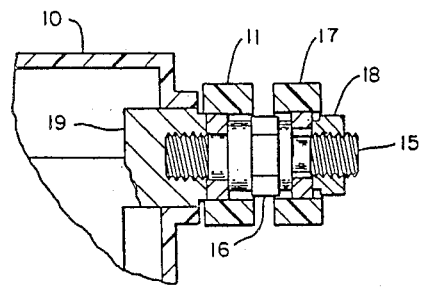
FIG.—2
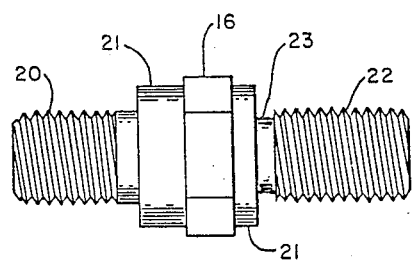
FIG.—3

SIDE MOUNT UNIVERSAL BATTERY TERMINAL

This invention generally relates to a means for connecting auxiliary electric devices to battery terminals. In particular, the invention is directed to means for connecting auxiliary electric devices to side-mounted terminals of a conventional automobile battery.

Motorists have been steadily increasing the number, size, power demand and type of electric devices which are installed in automobiles, such as high powered stereos, CB radios and tape players. Some motorists also attach various devices as televisions, stoves, hot plates, refrigerators, power antennas and other high power demand devices.

A principal problem involved in attaching these auxiliary electric devices is the lack of a convenient direct power terminal hook-up to the battery in the automobile. Conventional automobile batteries are provided with terminals which conveniently allow only one lead to be attached thereto. Thus, motorists have heretofore attempted to attach their auxiliary electric devices through the automobile fuse box to an existing hot lead, usually by stripping the insulation therefrom.

This method of connection has major drawbacks, i.e., there is insufficient electrical current to operate the device, often leading to constant blowing of fuses, and static or other electrical interference is collected by radios due to the stripped hot lead or due to insufficient ground connection. Therefore motorists have increasingly resorted to wiring auxiliary electric devices directly to the battery. However, a standard battery terminal on an automobile is not easily adaptable to this task since it provides for no attachments other than the main leads to the starter motor. Consequently, motorists have attempted to either strip the main battery leads and wire their electric devices to the stripped area or to clamp unwieldy tapping connectors onto the main battery leads. These methods create a substantial fire danger, lead to static, and may lead to failure of the starter system or other electrical components of the automobile. Alternatively, motorists have tried to wrap the power lead of the auxiliary electric device around the battery post, however, this is not a secure method of attachment and may lead to short circuiting, fires, and poor electrical connection.

Recently, original equipment automobile batteries have been provided wherein the battery terminals are located by bolts threaded into spaces provided on the side of the batteries. As with the conventional top-mounted terminal battery, no means is provided on such a side mounted terminal post battery for connecting auxiliary electric devices.

The present invention is directed to a threaded bolt means which is attached to the starter motor leads for a side-mounted terminal post battery, thereby providing a convenient connection terminal for auxiliary electric devices without the need to strip, or clamp into existing battery leads.

An object of the present invention, therefore is to provide for a threaded bolt means extending from the wall of the side-mounted terminal battery, such that auxiliary electric power and ground leads may be securely fitted to such extended threaded bolt means.

A further object of the invention is to provide for a threaded bolt extending from the wall of a side-mounted post battery, such that a standard nut may be threaded over the bolt extension, thereby securing the auxiliary electric leads to the battery.

Preferred embodiments of the invention are illustrated in the accompanying figures of which:

FIG. 1 is a top view of a conventional side-mounted terminal battery, one terminal of which has been adapted with the extended threaded bolt means according to the present invention.

FIG. 2 is a cross-sectional view taken along line 2 of FIG. 1.

FIG. 3 is an elevation of the preferred embodiment of the threaded bolt battery terminal connector according to the present invention.

Referring to FIG. 1, there is shown a top view of a conventional side-mounted terminal automobile battery terminal adapted with the extended threaded bolt according to the present invention. The original equipment positive terminal cable or lead 11 and negative terminal cable or lead 12 are shown. The negative lead 12 is connected to the battery terminal by the original equipment threaded bolt 13 (not shown) and secured thereto by conventional hexagonal nut 14.

The original equipment positive lead 11 is connected to the terminal by extended threaded bolt 15 which may be threaded into the threaded terminal hole by hexagonal portion 16 of bolt 15. A cable or lead for an auxiliary electric accessory 17 is illustrated and is secured to extended bolt 15 by a conventional nut 18. Each terminal cable or lead is conventional in the art and comprises a bored disc shaped terminal with a peripheral insulating cover.

Referring to FIG. 2, there is shown a cross-sectional view along line 2 in FIG. 1. It is shown that bolt 15 is threaded into the threaded portion 19 of the battery terminal. The original equipment battery lead 11 is secured by placing bolt 15 through a hole provided in lead 11 and is then tightened down to contact battery terminal 19 by utilizing threaded portion 16. Bolt 15 may then be placed through a hole in auxiliary lead 17 and secured by conventional nut 18.

Referring to FIG. 3, there is shown a preferred embodiment of the extended threaded bolt means according to the present invention. The threaded portion 20 is adapted to precisely fit into the threaded hole provided in a conventional side-mounted terminal battery. The annular cylindrical portions 21 of bolt 15 are of greater diameter than threaded portion 20 but are of a diameter sufficient to fit within the hole provided in a conventional battery terminal lead 11 or 12. The hexagonal head portion 16 is adapted to be tightened by a conventional wrench. The hexagonal configuration is not critical and may be configured in a square or other such equilateral polygonal configuration which could accommodate a wrench or other tool for applying torque thereto. The threaded extension 22 adapted to receive auxiliary electric leads is threaded to receive a conventional nut. The length of 22 may be of any convenient length, depending on the number and type of auxiliary leads which are desired to be connected thereto. The length of 22 is limited only by the clearance which is provided within the engine compartment of the automobile to accommodate the battery terminal leads. The unthreaded portion 23 is not critical, however, is present since most threading tools will not allow the threaded section 22 to be formed completely to the annular section 21. However, in order that a nut threaded on portion 22 be able to be tightened to contact portion 21 it is necessary that portion 23 be of a smaller diameter than the maximum diameter of threaded section 22.

The bolt 15 may be fabricated of any solid conducting material, preferably metal. Brass would be a preferred material due to its resistance to corrosion to battery acid. However, steel may also be used and a coating of a corrosion resistance conductive material, such as lead may be applied to bolt 15.

It is readily obvious that any number and types of terminals may be attached to the threaded portion 22 of bolt 15. If no auxiliary electrical leads are desired, nut 18 may be removed and all auxiliary terminals removed. However, the conventional terminal 11 will remain secured by the annular section 21 and hexagonal head section 16.

In addition, the side mount universal battery bolt has a machined portion 21 which fits the battery cable terminal in common use on side mount batteries. This portion 21 holds both the original terminal in place and an additional terminal to permit connecting another battery in either a series or parallel circuit.

what is claimed is:

1. In combination an automobile battery of the type having side mounted, threaded bolt hole terminal connectors, battery cables having bored disc shaped terminals with peripheral insulating covers and, an improved terminal connector bolt adapted to accommodate said battery cable terminals and other electrical accessory terminals comprising:

an elongated body of electrically conducting material having a longitudinal axis and an inner end and an outer end;

a first generally cylindrical threaded stud formed on the inner end of said body, said first stud having a length and diameter disposed to permit threaded engagement of said stud with one of said side mounted terminal connectors on said battery in electrical connection therewith, and to pass through the bore in one of said battery cable terminals;

a central portion on said body adjacent to and outwardly from said first stud, said central portion having a peripheral diameter greater than said first stud portion and having a first shoulder surface generally normal to the longitudinal axis of said body facing toward said inner end of said body and disposed to engage the face surface of one of said battery cable terminals in an electrically conducting relationship, and a second shoulder surface generally normal to the longtitudinal axis of said body facing toward the outer end of said body and disposed to engage the face surface of another of said battery cable terminals mounted outwardly from and adjacent thereto, in an electrically conducting relationship, said central portion having an axial length such that when said battery cable terminals are in engagement with respective said first and second shoulder surfaces, their insulating covers are spaced axially apart;

means defining wrench surfaces formed on the periphery of said central body portion and spaced axially from said first and second shoulder surfaces; and a second generally cylindrical stud having an unthreaded portion adjacent and axially outward of said second shoulder surface, and a threaded portion adjacent to said unthreaded portion and extending outwardly therefrom to the outer end of said body, said unthreaded portion having a diameter sufficiently less than the diameter of said threaded portion to permit passage of a nut threadedly mounted on said threaded portion and having an axial width less than the axial width of said nut, whereby when said nut is threadedly moved along said threaded portion toward the inner end of said bolt it will pass over said unthreaded portion and engage said second shoulder surface before disengaging from said threaded portion.

2. An improved terminal connector bolt as described in claim 1 in which:

said central portion is generally cylindrical and has a periphery less than the bore in said peripheral insulating covers.

* * * * *